United States Patent [19]

Ouhadi et al.

[11] Patent Number: 4,767,824

[45] Date of Patent: Aug. 30, 1988

[54] PROCESS FOR POLYMERIZING ACRYLIC MONOMERS AND POSSIBLY NON-ACRYLIC CO-MONOMERS

[75] Inventors: Trazollah Ouhadi; Rosalia Forte, both of Liege; Robert E. Jerôme, Tilff; Roger M. Fayt; Philippe J. Teyssié, both of Neuville-en-Condroz, all of Belgium

[73] Assignee: Compagnie Internationale de Participation, Luxembourg, Luxembourg

[21] Appl. No.: 795,062

[22] Filed: Nov. 5, 1985

[30] Foreign Application Priority Data

Nov. 5, 1984 [LU] Luxembourg ............................ 85627

[51] Int. Cl.$^4$ ............................ C08F 8/34; C08F 4/46
[52] U.S. Cl. .................................... 525/343; 525/353; 525/374; 525/384; 526/279; 526/174; 526/175
[58] Field of Search ....................... 526/174, 173, 175; 528/392; 525/353, 384, 374, 343

[56] References Cited

U.S. PATENT DOCUMENTS

Re. 27,878   1/1974   Sommars ............................ 526/174
4,292,421    9/1981   Boileau et al. ....................... 526/341

FOREIGN PATENT DOCUMENTS 0185641   6/1986   European Pat. Off. ............ 526/175
882586    11/1961  United Kingdom ................ 526/174

*Primary Examiner*—Joseph L. Schofer
*Assistant Examiner*—Peter F. Kulkosky
*Attorney, Agent, or Firm*—Sughrue, Mion, Zinn, Macpeak, and Seas

[57] ABSTRACT

This invention relates to a process for polymerizing acrylic monomers and possibly non-acrylic co-monomers by means of polymerization-initiating agents of the formula:

$$R-M \qquad (I)$$

in which M represents a metal selected among the alkaline and alkaline-earth metals and R represents an alkyl radical, which may have a straight or branched chain and contains 2 to 6 carbon atoms, or an aryl radical.

The polymerization or copolymerization is effected in the presence of an additive consisting of a salt of an alkaline or alkaline-earth metal and of a mineral acid, such as lithium chloride.

9 Claims, No Drawings

PROCESS FOR POLYMERIZING ACRYLIC MONOMERS AND POSSIBLY NON-ACRYLIC CO-MONOMERS

PRIOR ART

It is known to polymerize acrylic or methacrylic monomers, such as alkyl acrylates or methacrylates and to copolymerize such acrylic or methacrylic monomers with non-acrylic co-monomers, in the presence of various polymerization initiators, namely those of the above formula (I), such as sec.-butyl-lithium, and other initiators, such as the tertiary alcoholates of lithium and organic silicium-containing compounds, such as compounds containing trimethylsilyl groups.

It is also known to use in reactions of polymerization of acrylic and methacrylic monomers and of copolymerization of such monomers and of co-monomers, various additives and catalysts, such as sources of azide, cyanide or fluoride ions or a Lewis acid.

DESCRIPTION OF THE INVENTION

It has now been found that it is advantageous to effect a polymerization of acrylic or methacrylic monomers, possibly together with non-acrylic monomers, by means of a catalyst of the above formula (I), in the presence of a co-catalyst or additive consisting of a salt of an alkaline or alkaline-earth metal, preferably a halide of such a metal, such as lithium chloride or baryum chloride.

It has been found that the alkaline or alkaline-earth metal salt, such as lithium chloride, stabilizes both the pair of ions of the initiator and the pair of ions of the polymerizing chain.

As found by Applicants, the simultaneous use of a salt of an alkaline or alkaline-earth metal and of an iniator of the formula R-M as defined above, produces remarkable effects. Such a use enables (1) to control the initiation of the polymerization or copolymerization by avoiding secundary reactions on the carbonyl group of the acrylic or methacrylic monomer, (2) to control the propagation of the polymerization by avoiding the secundary reactions on the carbonyl groups between the polymer chains or between such a chain and a monomer, (3) to inhibit the formation of dormant sites (i.e. of intramolecular cylizations) so as to give a better distribution of the masses of the polymers and copolymers and to allow the preparation of polymers having predetermined structures and masses and (4) to prepare block-copolymers by a single polymerization operation in the same reactor.

The use of a salt of an alkaline or alkaline-earth metal, such as lithium chloride (LiCl) in the process according to the invention enables the adjustment of the reactivity of the initiator. It advantageously decreased the reactivity of this initiator and makes it selective towards the double bound of the acrylic or methacrylic monomer instead of towards the ester group this monomer.

It has also been found that the use of an alkaline or alkaline-earth metal, particularly a halide of such a metal, such as a chloride, bromide, fluoride or iodide of lithium, potassium, sodium, baryum or magnesium, preferably lithium chloride, together with the use of catalysts of the formula $$R-M \quad (I)$$

in which M represents an alkaline or alkaline-earth metal and R represents an alkyl radical containing 1 to 18 carbon atoms, preferably to 2 to 6 carbon atoms, more particularly 4 carbon atoms, such as sec.-butyllithium or tert.-butyllithium, for the polymerization of acrylic monomers, avoid the secundary effects on the carbonyl group or on the hydrogen atom in the $\alpha$ position, in the case of acrylic esters. These secundary effects are detrimental, since they stop the growing of the polymer chains, they create dormant sites of centres and they permot transfer reactions which inhibit the control of the molecular masses of the polymers. These secundary reactions also inhibit the addition of functional groups, such as carboxy (COOH), sulphonic ($SO_3H$), hydroxy (OH) or tertiary amino groups to the ends of the polymer chains, as well as the formation of block-copolymers.

All the above drawbacks are avoided by the use of additives consisting of a halide of an alkaline or alkaline-earth metal, such as LiCl, in accordance with this invention.

This invention relates therefore to a process for polymerizing acrylic monomers and possibly non-acrylic co-monomers by means of polymerization initiating agents of the formula:

$$R-M \quad (I)$$

in which M represents a metal selected among the alkaline and alkaline earth-metals and R represents an alkyl radical which may have a straight or branched chain and contains preferably 2 to 6 carbon atoms, or an aryl radical, said process being characterized by the fact that an additive or co-catalyst consisting in a salt of an alkaline or alkaline-earth metal of a mineral or organic acid is also used.

As examples of such additives or co-catalysts, the mineral salts, particularly the sulfate, nitrate, borate and halides of alkaline and alkaline-earth metals, such as sodium, potassium, lithium, baryum and magnesium may be cited. It is preferred to use, among the halides, the chloride, bromide, iodide or fluoride of lithium, more particularly the lithium chloride. However, it is also possible to use, in accordance with the invention, baryum chloride, bromide or iodide, lithium borate, magnesium nitrate and sodium or potassium chloride.

The salts of alkaline and alkaline-earth metals used in accordance with the invention, particularly lithium chloride, cause a strong coordination with the carbanionic centre which is responsible of the initiation and of the propagation of the polymerization of the alkyl esters of acrylic and methacrylic acids.

As acrylic monomers, it is possible to use, in the process according to the invention, the esters of the acrylic and methacrylic acids, the dialkylacrylamides, the acrylonitrile, the methacrylonitrile and their mixtures.

The acrylic monomer is preferably an alkyl acrylate or methacrylate, in which the alkyl radical contains 1 to 18 carbon atoms, more particularly methyl, t.-butyl or benzyl methacrylate, this alkyl radical being possibly substituted by fluorine, a tertiary amino group or a carbalkoxy group, such as an acetoxy group.

Non-acrylic co-monomers which may be used in the process according to the invention may be advantageously selected among the butadiene, the isoprene, the possibly substituted styrenes, the cyclosiloxanes, the vinylnaphthalenes and the vinyl pyridines. Co-monomers of the styrene type may be $\alpha$-methylstyrene and tert.-butylstyrene. In the vinylpyridine co-monomer, the vinyl group may be in the 2 or 4 position.

The process according to the invention allows the preparation of polymers and copolymers in which the chain ends are functionalized, as well as the preparation of block-copolymers having a predetermined distribution of the masses of the polymer chains.

In the process according to the invention, the proportions of the alkaline or alkaline-earth metal salt, such as LiCl, may vary within wide limits, namely in respect to the used initiator. The amount of LiCl may, for example, be largely in excess with respect to the amount of initiating agent. This amount of LiCl may also be equal or lower than the molar amount of initiating agent.

In the process according to the invention, the polymerization or copolymerization is effected in the absence of humidity and oxygen, but in the presence of at least one solvent selected among the aromatic solvents, such as benzene or toluene, as well as tetrahydrofuran and dimethylformamide.

The polymerization or copolymerization temperature may vary between $-78°$ C. and the room temparature, the polymerization being possible, for example, at $0°$ C.

The process according to the invention is illustrated by the following non-limitative examples.

EXAMPLE 1

Preparation of tert.-butyl polyacrylate (tBuA)

0.1 g ($2.4.10^{-3}$ moles) of lithium chloride (LiCl) are introduced into a previously dried reactor, in an atmosphere of argon or nitrogen.

The lithium chloride is completely dehydrated by heating under vacuum in an oil bath at $150°$ C. during 3 hours. The lithium chloride is then allowed to return to the room temperature under a pressure of nitrogen or argon and 150 ml of predried tetrahydrofuran (THF) and 0.2 ml of $\alpha$-methylstyrene (used for indicating the complete dehydration of the reaction mixture) are added to the lithium chloride, together with a 0.5 molar solution of sec.-butyllithium (s.BuLi) in heptane which is added drop by drop and while stirring, until a persistent red colour appears. 0.5 ml of said solution ($2.5.10^{-4}$ moles) of s.BuLi are then added.

The mixture is cooled to a temperature of $-78°$ C. in a mixture of acetone and carbon dioxide ice. After 30 minutes, while the temperature is still at $-78°$ C., 90 ml of a benzene solution containing 10% by volume of tert.-butyl acrylate (t.BuA) (7.9 g of t.BuA) previously dried by means of diethyl aluminum (1 ml of 1M solution in benzene) and distilled are added.

The reaction is stopped after 90 minutes by addition of 5 ml of methanol (MeOH). After removal of the solvents (THF, heptane and benzene), 7.7 g of polymer are obtained (yield: 97,4%).

The analysis of the polymer of chromatography on permeable gel (GPC) gives the following values for:
$\overline{Mn}$: number average molecular weight (calibration with polystyrene)
$\overline{Mw}$: weight average molecular weight (calibration with polystyrene)
$\Delta M = (\overline{Mw}/\overline{Mn}$: molecular weight distribution
$\overline{Mn}$: 58,000
$\overline{Mw}$: 71.800
$\Delta M$: 1.2

In the present example, as well as in the following examples, the THF has been previously dried on sodium/benzophenone and the $\alpha$-methystyrene on calcium hydride ($CaH_2$).

EXAMPLE 2

Preparation of tert.-butyl polyacrylate (t.BuA)

The same method as in example 1 is used, except that 0.2 g ($4.8.10^{-3}$ moles) of LiCl and $5.10^{-4}$ moles of s.BuLi, i.e. twice the amount of LiCl and of s.BuLi used in example 1, are used.

7.6 g of polymer are obtained (yield: about 96%).

The chromatographic analysis (GPC) gives the following results:
$\overline{Mn}=30,000$
$\overline{Mw}=30,300$
$\Delta M=1.31$ The evolution of the value of $\overline{Mn}$ follows that of the monomer/initiator (S.BuLi) molar ratio.

EXAMPLE 3

Preparation of t.-butyl polyacrylate (t.BuA)

By working under the same conditions as in example 1, except that 0.25 g ($6.10^{-3}$ moles) of LiCl and $6.5.10^{-4}$ moles of s.BuLi are used, 7.7.g of polymer are obtained, this polymer having the following properties:
GPC:
$\overline{Mn}=22,000$
$\overline{Mw}=28,800$
$\Delta M=1.31$ Since the molar ratio of monomer to the initiator has decreased in comparison with examples 1 and 2, the value of $\overline{Mn}$ decreases accordingly.

EXAMPLE 4

Preparation of t.-butyl polyacrylate (t.BuA)

The products and the method of example 1 are used, except that 0.14 g ($3.3.10^{-4}$ moles) of LiCl and $3.3.10^{-4}$ moles of s.BuLi are used. 7.8 g of polymer are obtained (yield: about 99%).
GPC:
$\overline{Mn}=40,000$
$\overline{Mw}=48,000$
$\Delta M=1.20$ Again the amount of s.BuLi decreases by a factor of 2 by comparison of example 3 and the value of $\overline{Mn}$ increases in the same proportion.

EXAMPLE 5

Preparation of t.-butyl polyacrylate (t.BuA)

Into a reactor which has been previously dried, 0.15 g ($3.5.10^{-3}$ moles) of LiCl are introduced under a pressure of nitrogen.

The lithium chloride is completely dehydrated by heating under vacuum in an oil bath at $150°$ C. during 3 hours.

When the LiCl has returned to the home temperature under a nitrogen pressure, 100 ml of THF and 0.2 ml (0.18 g; $1.5.10^{-3}$ moles) of $\alpha$-methylstyrene are added, together with a 0.5 molar solution of s.BuLi in heptane, said solution being added drop by drop and while stirring until a persistent red colour appears.

When this red colour is obtained, 0.8 ml of the solution of s.BuLi ($4.10^{-4}$ moles of s.BuLi) are added.

The content of the reactor is then cooled at a temperature of $-78°$ C. by means of a mixture of acetone and carbon dioxide ice and after thirty minutes, 27 ml of a solution of t.BuA (10%) in benzene (2.4 g of t.BuA), previously dried on triethylaluminum and distilled, are added.

After three minutes, a fraction of a few ml of the solution is removed for analysis for chromatography.

18 ml of a benzene solution containing 10% by volume of t.BuA (1.6 g of t.BuA) are added to the remaining solution.

After 30 minutes, the polymerization is stopped by addition of 5 ml of MeOH.

The solvents are removed from the separated fraction and from the final product.

The total amount of polymer is 3.8 g (yield: 100%).

ANALYSIS

Separated fraction GPC
$\overline{M}n = 10,800$
$\overline{M}w = 13,300$
$\Delta M = 1.23$
Final product GPC
$\overline{M}n = 18,700$
$\overline{M}w = 24,500$
$\Delta M = 1.31$ This example shows that the polymerization reaction is living. This means that it is possible to continue the polymerization by adding a supplementary amount of monomer.

EXAMPLE 6

Preparation of t.-butyl polyacrylate 0.09 g ($2.1.10^{-3}$ moles) of LiCl are introduced into a previously dried reactor, under a pressure of nitrogen. The lithium chloride is dried under vacuum in an oil bath at a temperature of 150° C. during 3 hours.

150 ml of THF (dried on sodium/benzophenone) and 0.2 ml (0.18 g; $1.5.10^{-3}$ moles) of α-methylstyrene (dried on CaH$_2$) are added to the cooled lithium chloride in an atmosphere of nitrogen.

A 0.5 molar solution of s.BuLi in heptane is simultaneously added drop by drop and while stirring, until a persistent red colour is obtained. When this colour is obtained, 0.5 ml of the solution of s.BuLi ($1.5.10^{-4}$ moles of s.BuLi) are added.

In the mixture brought to a temperature of $-78°$ C. on acetone/carbon dioxide ice, 130 ml of a 10% solution of t.BuA (dried on AlEt$_3$) in THF (dried on styryllithium) are introduced after 30 minutes. 11.5 g of t.BuA have thus been added.

The reaction is stopped after 4 minutes by addition of 5 ml of methanol. After removal of the single reaction solvent (THF), 1.5 g of polymer (conversion rate: 13%) are obtained.
GPC
$\overline{M}n = 16,900$
$\overline{M}w = 20.300$
$\Delta M = 1.2$

EXAMPLE 7

Preparation of t.-butyl polyacrylate

When the test is performed exactly as described in example 6, except that the reaction is stopped after 15 minutes, 5.95 g of polymer (yield: 52%) are obtained.
GPC
$\overline{M}n = 70,400$
$\overline{M}w = 85,800$
$\Delta M = 1.22$

EXAMPLE 8

Preparation of t.-butyl polyacrylate

When the test is performed exactly in the same manner as in example 6, except that reaction is stopped after 90 minutes, 11.5 g of polymer (yield: 100%) are obtained.

GPC
$\overline{M}n = 131,600$
$\overline{M}w = 176,300$
$\Delta M = 1.34$

EXAMPLE 9

Preparation of t.-butyl polyacrylate 0.2 g ($4.7.10^{-3}$ moles) of LiCl are introduced into a dried reactor and the LiCl is dried on an oil bath at a temperature of 150° C. during 3 hours. The lithium chloride is allowed to return to the room temperature under nitrogen.

100 ml of THF dried on sodium/benzophenone and 0.2 ml of α-methylstyrene (0.18 g), are added together with a 0.5 molar solution of s.BuLi in heptane, this solution being added until a red persistant red colour appears. An additional amount of 1 ml of this solution ($5.10^{-4}$ moles of s.BuLi) is added.

The mixture is brought to a temperature of 0° C. during 1 hour and 5 ml of a 10% by volume solution of t.BuA in benzene (0.55 g of t.-butyl acrylate) are added drop by drop. The remaining 4 ml of this solution (3.6 g of t.BuA) are then added quickly. The reaction is stopped after 1 hour, by addition of 5 ml of methanol.

3.5 g of polymer are obtained after removal of the solvents.
GPC
$\overline{M}n = 6,200$
$\overline{M}w = 8,600$
$\Delta M = 1.4$

EXAMPLE 10

Preparation of methyl polymethacrylate (PMMA)

A small amount (0.08 g; $1.9.10^{-3}$ moles) of lithium chloride are introduced into a previously dried reactor and dried under vacuum on an oil bath at a temperature of 150° C. during 3 hours.

When the lithium chloride has been allowed to return to the room temperature, under nitrogen, 100 ml of THF dried on sodium/benzophenone and 100 ml of toluene dried on lithium aluminum hydride (LiAlH$_4$) are added together with 0.2 ml of α-methystyrene dried on CaH$_2$. At the same time, a 0.4 molar solution of sec.-butyllithium (s.BuLi) in heptane is added until a persistent red colour appears. When this colour has been obtained, 0.4 ml of the solution of sec.-butyllithium ($1.6.10^{-4}$ moles) are still added.

The mixture is cooled to a temperature of $-78°$ C. in acetone and carbon dioxide ice within 30 minutes.

11 ml of methylmethacrylate (MMA) dried on triethylaluminum (AlEt$_3$) are then added.

After 1 hour, the reaction is stopped by adding a few ml of methanol and the polymer is then precipitated in technical methanol.

After filtration, 10 g of PMMA are obtained.
GPC
$\overline{M}n = 71,800$
$\overline{M}w = 84,200$
$\Delta M = 1.17$ When the same operating conditions are used, except that no lithium chloride is used, 10.1 g of a polymer having a much larger distribution of the molecular weights is obtained:
GPC
$\overline{M}n = \mathbf{101.300}$
$\overline{M}w = 174,800$
$\Delta M = 1.7$

EXAMPLE 11

Preparation of a t.-butyl acrylate-styrene copolymer 150 ml of THF dried on sodium/benzophenone and 0.1 ml of styrene (0.09 g) dried on CaH₂ are introduced into a reactor containing 0.1 g of LiCl ($2.4.10^{-3}$ moles) dried under vacuum at 150° C. in an oil bath during 3 hours and cooled under nitrogen to the room temperature.

After cooling the mixture at −78° C., a 0.5 molar solution of sec.-butyllithium (s.BuLi) in heptane is added until a yellow colour is obtained. Thereafter, 0.6 ml of the solution of s.BuLi ($3.10^{-4}$ moles of s.BuLI) and 7 ml of styrene (6.3 g) dried on fluorenyllithium are added.

The polymerization is continued during 1 hour and 80 ml of a solution containing 10% by volume of tert.-butyl acrylate in benzene (7.1 g of t.BuA) dried on triethylaluminum and distilled are then added. The reaction is stopped by means of methanol after 90 minutes. The solvent is removed and 13.2 g of copolymer are obtained.

GPC
$\overline{M}n = 57,000$
$\overline{M}w = 74,100$
$\Delta M = 1.3$

EXAMPLE 12

Preparation of a tert.-butyl acrylate-isoprene copolymer 50 ml of benzene dried on CaH₂, 1 ml of a 0.5 molar solution of sec.-butyllithium in heptane ($5.10^{-4}$ moles of s.BuLi) and 11 ml (7.5 g) of isoprene dried on n-buthyllithium are introduced, under nitrogen, into a dried reactor containing 0.1 g of lithium chloride ($2.4.10^{-3}$ moles) dried under vacuum in an oil bath at 150° C. during 3 hours and cooled to the room temperature.

The mixture is then maintained at 35° C. during 18 hours.

When the temperature of the reaction medium has been allowed to return to the room temperature, 0.5 ml (0.45 g) of styrene dried on fluorenyl lithium and 20 ml of THF are introduced into the reactor, while maintaining the content of this reactor at a temperature of −78° C.

After 1 hour, 50 ml of a solution containing 10% by volume of t.BuA in benzene (4.4 g of t.BuA) dried on triethylaluminum and distilled are introduced into the reactor.

The reaction is stopped after 90 minutes by means of methanol.

12 g of copolymer are obtained after removal of the solvents.

GPC
$\overline{M}n = 42,000$
$\overline{M}w = 52,500$
$\Delta M = 1.25$

EXAMPLE 13

Preparation of a methyl methacrylate-styrene copolymer 0.1 g of LiCl ($2.4.10^{-3}$ moles) are introduced into an atmosphere of lithium contained in a dried reactor.

The lithium chloride is dried by treatment under vacuum during 3 hours in an oil bath at 150° C.

The lithium chloride is then allowed to return to the room temperature and 25 ml of toluene dried on lithium-aluminum-hydride (LiAlH₄), 0.1 ml (0.09 g of styrene dried on CaH₂ and a 0.5 molar solution of sec.-butyllithium in heptane are then added, under nitrogen, until a yellow colour is obtained.

After the yellow colour appears, 0.4 ml of the solution of s.-butyllithium ($2.10^{-4}$ moles of s.BuLi) are still added.

The mixture is cooled to −78° C. in a mixture of acetone and carbon dioxide ice, whereafter 225 ml of THF dried on styryl-lithium and 12 ml (10.8 g) of styrene dried on fluorenyl-lithium are added.

After 1 hours, 12 ml (11.2 g of methylmethacrylate (MMA) dried on triethylaluminum are added.

The reaction is stopped after 1 hour by means of methanol. The copolymer is precipitated in 2 liters of technical methanol and filtered. 21.9 g of copolymer are obtained.

GPC
$\overline{M}n = 97,000$
$\overline{M}w = 127,300$
$\Delta M = 1.3$

The obtained product is fractionated by introducing 4.21 g of the crude copolymer in an Erlenmeyer flask and by addition thereto of 200 ml of cyclohexane, which is a selective solvent of the polystyrene. The system is stirred during 24 hours at the room temperature and during 48 hours at 40° C. After filtration of the insoluble product on a filter, washing and drying, 4.12 g of insoluble copolymer are obtained. (yield: 98%).

EXAMPLE 14

Preparation of a methylmethacrylate-styrene copolymer

The method described in example 13 is used, except that dehydrated baryum chloride (BaCl₂) is used instead of lithium chloride. 0.5 g ($2.10^{-3}$ moles) of baryum chloride are used. 22 g of product are obtained. After fractionation, it is found that the synthesis product contains 97.5% of copolymer.

GPC
$\overline{M}N = 100,600$
$\overline{M}w = 129,700$
$\Delta M = 1.29$

EXAMPLE 15

Preparation of a n-hexyl methacrylate-styrene copolymer

When working in the same manner as described in example 13, except that 12 ml (10.7 g) of n-hexyl methacrylate are used instead of MMA, 21.2 g of copolymer are obtained.

GPC
$\overline{M}n = 95,400$
$\overline{M}W = 124,500$
$\Delta M = 1.3$

EXAMPLE 16

Preparation of a n-butyl methacrylate-styrene copolymer

The method described in example 13 is used, except that, instead of MMA, 12 ml (10.8 g) of n-butyl methacrylate are used. 21.3 g of copolymer are obtained.

GPC
$\overline{M}n = 94,400$
$\overline{M}w = 124,500$
$\Delta M: 1.3$

EXAMPLE 17

Preparation of a methyl methacrylate-isoprene copolymer

The method of example 12 is used, except that, instead of tert.-butylacrylate, methylmethacrylate is used (8 ml; 7.4 g).

The copolymer is precipitated in 2 liters of technical methanol. 14.8 g of copolymer are obtained.

GPC
$\overline{M}n=59,800$
$\overline{M}w=73.200$
$\Delta M=1.22$

The obtained product is fractionated by introducing 3.96 g of the product into an Erlenmeyer flask. After addition of 200 ml of cyclohexane (which dissolves the homopolymer of isoprene and the homopolymer of styrene which are present), the product is stirred during 72 hours. The insoluble material is filtered. 3.41 g (yield: 86%) of copolymer are obtained.

EXAMPLE 18

Preparation of a methyl-polymethacrylate containing carboxy groups at the ends of the chain 0.2 g of lithium chloride ($4.7.10^{-3}$ moles) are introduced, under an atmosphere of nitrogen, in a dried reactor. The lithium chloride is dried in an oil bath at a temperature of 150° C. during 3 hours.

200 ml of THF dried on sodium/benzophenone and a 0.1 molar solution of naphthalene-sodium (initiating agent) in THF are added to the lithium chloride at room temperature under nitrogen, until a green colour appears, whereafter 5 ml of this solution of naphthalene-sodium ($5.10^{-4}$ moles of naphthalene-sodium) are still added.

The mixture is cooled to a temperature of $-78°$ C., whereafter 10 ml (9.3 g) of methyl methacrylate dried on triethyl-aluminum are added thereto.

The polymerization is then continued during 90 minutes and stopped by introduction of gaseous $CO_2$, under vigorous stirring.

The dicarboxylated homopolymer is precipitated in 2 liters of technical methanol which has been acidified by means of hydrochloric acid. After filtration and washing with methanol, 9.3 g of the product are obtained.

2.84 g of the product are dissolved in 50 ml of a 9:1 mixture of benzene and methanol and the acid functions (COOH) are analyzed by means of 6.8 ml of a 0.0203 molar solution of tetramethyl ammonium hydroxide ($1.36.10^{-4}$ moles) in a 9:1 mixture of benzene and methanol.

The following results are obtained:
GPC
$\overline{M}n=37,000$
$\overline{M}w=45,000$
$\Delta M=1.22$ Analysis:
Number of theoretical acid functions: $1.54.10^{-4}$
Number of titrated acid functions: $1.36.10^{-4}$
Functionality: 1.8

EXAMPLE 19

Preparation of a methyl polymethacrylate containing acid functions

The method used in example 18 is applied except that no lithium chloride is used. 9.1 g of a product having a much wider dispersion of the molecular weights than in example 18 are obtained. The functionality of the product is much lower than in example 18, as shown by the following analytical results:

GPC
$\overline{M}n=52,400$
$\overline{M}w=96,100$
$\Delta M=1.83$

Analysis

After treatment of 2.83 g of the product by $6.0.10^{-5}$ moles of tetramethylammonium hydroxide:
Number of theoretical acid functions: $1.08.10^{-4}$
Number of titrated acid functions: $6.0.10^{-5}$
Functionality: 1.1

EXAMPLE 20

Preparation of a tert.-butyl polyacrylate containing carboxy end groups 0.2 g of LiCl ($5.10^{-3}$ moles) are introduced, under nitrogen, into a dried reactor and dried under vacuum in an oil bath at a temperature of 150° C. during 3 hours.

150 ml of THF dried on benzophenone/sodium, 0.2 ml (0.18 g) of α-methyl-styrene dried $CaH_2$ and a 0.1 molar solution of naphthalene sodium in THF are then added to the lithium chloride at the room temperature until a persistent red colour appears, whereafter 5 ml of the naphtalene-sodium solution are added ($5.10^{-4}$ moles of naphthalene-sodium).

The mixture is cooled to $-78°$ C. and after 15 minutes, 70 ml of a 10% by volume of tert.-butyl acrylate solution in benzene (6.2 g of tert.-butyl acrylate) are added.

The reaction is stopped after 90 minutes by introduction of gaseous $CO_2$, under vigorous stirring.

The solvents are then removed and the carboxylated polymer is dissolved again in THF and precipitated in a 1:3 mixture of methanol and acidified water. 6.1 g product are obtained.

3.82 g of the obtained product are dissolved in a 9:1 mixture of benzene and methanol and the acid functions are titrated by 11.85 ml of a 0.0184 molar solution of tetramethylammonium hydroxide ($2.18.10^{-4}$ moles of this hydroxide).

$GPC$ $Mn = 27,900$
$Mw = 36,500$ theoretical Mn $= \frac{\text{monomer mass}}{\text{amount of initiator}} = 24,800$ $\Delta M = 1.31$ Analysis
Number of theoretical acid functions: $2.75.10^{-4}$
Number of titrated acid functions: $2.18.10^{-4}$
Functionality: 1.6.

When the method described hereabove is used, without lithium chloride, 5.2 g of a product are obtained. The GPC analysis of this product shows a bimodal and broad distribution of the molecular weights.

As shown by the following examples, the homopolymers and copolymers obtained by the process according to this invention may be easily converted, possibly in the same reactor, into useful polymers or copolymers of the acrylate type by alcoholysis by means of an alcohol or into useful polymers or copolymers of the acrylic acid type by hydrolysis.

EXAMPLE 21

Transesterification of a t.-butyl polyacrylate into a n.-butyl polyacrylate

A t.-butyl polyacrylate (PtBuA) is converted into a n.-butyl polyacrylate (PnBuA) by alcoholysis by means of n-butanol by the following method:

1.4 g of PtBuA ($1.1.10^{-2}$ moles of t.-butyl acrylate; $\overline{M}n = 30,000$), 1.9 g of monohydrated paratoluene sulfonic acid ($1.10^{-3}$ moles) and 100 ml of n-butanol previously dried on magnesium turnings are introduced into a balloon or reaction flask equiped with a cooler which is itself connected to another balloon.

The mixture is heated to 100° C. under a slight stream of nitrogen and is stirred by means of a magnetic stirrer. The heating is stopped after 60 hours. After removal of the solvent, the residue is dissolved in 20 ml of ethyl ether. The obtained solution is washed three times with water and the solvent is again removed under vacuum. The obtained polymer is finally dried under vacuum during 24 hours at room temperature.

Analysis of the product

NMR H': the characteristic peak of t.-butyl ($\delta = 1.39$ ppm) has disappeared and the characteristic peak of n-butyl ($\delta = 3.5$) is present.

The Tg of the polymer has been determined by differential scanning calorimetry (DSC). The registered value ($-50°$ C.) is very near to that given in the literature for the PnBuA ($-48°$ C.), this value being of $+47°$ C. for the PtBuA. This shows that practically pure PnBuA has been formed.

EXAMPLE 22

Hydrolysis of a block copolymer of styrene and t.-butyl acrylate (PS-PtBuA)

3 g of PS-PtBuA (65% of polystyrene and 35% of poly-t.-butyl acrylate; $\overline{M}n = 50,000$), 97 ml of pure dioxane and 0.3 g of monohydrated p-toluene sulfonic acid dissolved in 3 ml of water are introduced into a balloon equiped with a cooler.

The mixture is refluxed during 48 hours. The product is precipitated in heptane, filtrated, washed first with heptane and then several times with water. Finally, it is dried under vacuum at room temperature during 24 hours.

Analysis of the product

NMR H' spectrum: complete disappearance of the characteristic peaks of t.-butyl ($S = 1.39$ ppm).

Potentiometric acid-base titration:

1.5 g of the copolymer are dissolved in 50 ml of dioxane and titrated with 11.25 ml of a 0.4M solution of KOH in methanol.

$^n$COOH titrated: $4.5.10^{-3}$ moles $^n$COOH theoretical: $4.8.10^{-3}$ moles This shows that 94% of the block copolymer PS-PtBuA have been hydrolyzed.

What is claimed is:

1. A process for polymerizing acrylic monomers or for polymerizing acrylic monomers with comonomers selected from the group comprising acrylic, vinyl, diene and cyclosiloxane comonomers, in which the polymerization reaction is carried out in at least one organic solvent at a temperature between $-78°$ C. and room temperature and in the absence of humidity and oxygen, by means of butyl-lithium as an initiating agent, said polymerization or copolymerization being effected in the presence of a lithium chloride or additive, said at least one organic solvent being selected so that said monomers or said comonomers, said initiating agent, said additive and polymers or copolymers resulting from said polymerization reaction are dissolved in said at least one organic solvent during the polymerization reaction, the amount of said monomers or said comonomers and/or the amount of said initiating agent being adjusted so as to obtain a polymer or copolymer having a predetermined number average molecular weight which is proportional to the amount of monomers or comonomers used in said polymerization reaction, and inversely proportional to the amount of said initiating agent used in said polymerization reaction.

2. A process according to claim 1, in which the acrylic monomer is selected among the esters of acrylic and methacrylic acids, the dialkylacrylamides, the acrylonitrile, the methacrylonitrile and the mixtures thereof.

3. The process according to claim 2, in which the acrylic monomer is an alkyl acrylate or methacrylate, in which the alkyl radical contains 1 to 18 carbon atoms.

4. A process according to claim 2, in which the acrylic monomer is tert.-butyl acrylate or methacrylate.

5. A process according to claim 2, in which the alkyl radical of the acrylic or methacrylic monomer is substituted by fluorine, a tertiary amino group or a carbalkoxy group.

6. A process according to claim 1, in which the nonacrylic comonomer is selected among the butadiene, the isoprene, the styrene which may possibly be alkylated, the cyclosiloxanes, the vinyl naphthalene and the vinyl pyridines.

7. A process according to claim 1, in which the ends of the chain of the acrylic polymer or copolymer contain a functional group selected from carboxy, sulfonic, hydroxy, and tertiary amino groups which is added by aftertreatment.

8. A process according to claim 1, wherein said organic solvent is an aromatic solvent.

9. A process according to claim 1, wherein the organic solvent is selected from the group consisting of benzene, toluene, heptane, tetrahydrofuran, and dimethylformamide.

* * * * *

UNITED STATES PATENT AND TRADEMARK OFFICE
CERTIFICATE OF CORRECTION

PATENT NO. : 4,767,824

DATED : August 30, 1988

INVENTOR(S) : Trazollah Ouhadi, Rosalia Forte, Robert Jerome, Roger Fayt and Phillippe Teyssie It is certified that error appears in the above-identified patent and that said Letters Patent is hereby corrected as shown below:

Column 1, line 45 delete "cylizations" and insert --cyclizations--.
Column 2, line 9 delete "permot" and insert --promote--.
Column 3, line 55 delete "of chromatography" and insert --by chromatography--.
Column 3, line 61 delete " M = (Mw/Mn" and insert -- M = $\bar{M}w/\bar{M}n$--.
Column 3, line 63 delete "71.800" and insert -- 71,800 --.
Column 4, line 68 delete "for chromatography" and insert --by chromatography--
Column 7, line 13 delete "moles of s.BuLI)" and insert --moles of s.BuLi--.
Column 10, line 45 delete "GPC Mn ..." and insert GPC $\bar{M}n$ ...".
Column 10, line 46 delete "Mw" and insert --$\bar{M}w$--.
Column 10, line 47 delete "theoretical Mn" and insert --theoretical $\bar{M}n$--.
Column 12, line 10 delete "lithium chloride or additive" and insert --lithium chloride additive--.

Signed and Sealed this

Twenty-fourth Day of October, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,767,824

DATED : August 30, 1988

INVENTOR(S) : Trazollah Ouhadi, Rosalia Forte, Robert Jerome, Roger Fayt and Phillippe Teyssie It is certified that error appears in the above-identified patent and that said Letters Patent is hereby corrected as shown below:

On the title page,
[73] Assignee: delete "Compagnie Internationale de Participation" and insert therefor: --Compagnie Internationale de Participation et d'Investissement CIPARI S.A.--.

Signed and Sealed this

Twenty-sixth Day of December, 1989

Attest:

JEFFREY M. SAMUELS

Attesting Officer     Acting Commissioner of Patents and Trademarks